United States Patent
Desai et al.

(10) Patent No.: US 10,552,374 B2
(45) Date of Patent: Feb. 4, 2020

(54) MINIMIZING FILE CREATION AND ACCESS TIMES USING SKIP OPTIMIZATION (71) Applicant: VMWARE, INC., Palo Alto, CA (US)

(72) Inventors: Asit Desai, Palo Alto, CA (US); Bryan Branstetter, Berkeley, CA (US); Prasanna Aithal, Bangalore (IN); Prasad Rao Jangam, Palo Alto, CA (US); Mahesh S Hiregoudar, Bangalore (IN); Rohan Pasalkar, Palo Alto, CA (US)

(73) Assignee: VMwre, Inc., Palo Alto, CA (US)

( * ) Notice: Subject to any disclaimer, the term of this patent is extended or adjusted under 35 U.S.C. 154(b) by 272 days.

(21) Appl. No.: 15/666,606

(22) Filed: Aug. 2, 2017

(65) Prior Publication Data
US 2018/0285375 A1 Oct. 4, 2018

(30) Foreign Application Priority Data
Mar. 31, 2017 (IN) .............................. 201741011589

(51) Int. Cl.
G06F 17/30 (2006.01)
G06F 16/13 (2019.01)
G06F 12/02 (2006.01)
G06F 12/1036 (2016.01)
G06F 16/17 (2019.01)

(52) U.S. Cl.
CPC ............ G06F 16/13 (2019.01); G06F 12/023 (2013.01); G06F 12/1036 (2013.01); G06F 16/1727 (2019.01); G06F 2212/1044 (2013.01); G06F 2212/65 (2013.01)

(58) Field of Classification Search
CPC .... G06F 16/13; G06F 16/1727; G06F 12/023; G06F 12/1036
USPC .................................................. 707/600–899
See application file for complete search history.

(56) References Cited

U.S. PATENT DOCUMENTS

2015/0212756 A1* 7/2015 Coronado ............. G06F 3/0647
711/114

* cited by examiner

Primary Examiner — Isaac M Woo
(74) Attorney, Agent, or Firm — Fish & Richardson P.C.

(57) ABSTRACT

Exemplary methods, apparatuses, and systems determine whether a skip optimization process can be used to store a file in a storage space. When it is determined that the skip optimization can be performed, a file stored in the storage space can be referenced in a file metadata data structure using direct addressing of file blocks storing the file instead of through indirect addressing (e.g., pointer addresses stored in pointer blocks).

20 Claims, 4 Drawing Sheets

MINIMIZING FILE CREATION AND ACCESS TIMES USING SKIP OPTIMIZATION

RELATED APPLICATIONS

Benefit is claimed under 35 U.S.C. 119(a)-(d) to Foreign Application Serial No. 201741011589 filed in India entitled "MINIMIZING FILE CREATION AND ACCESS TIMES USING SKIP OPTIMIZATION", on Mar. 31, 2017, by VMware, Inc., which is herein incorporated in its entirety by reference for all purposes.

FIELD OF THE INVENTION

The various embodiments described in this document relate to the management and optimization of storage spaces consisting of file blocks.

BACKGROUND OF THE INVENTION

During the power on operation of a virtual machine (VM) on a host, the host file system creates a swap file. The swap file is a file in storage used by the virtualization layer of the host to swap the VM's memory in and out of the host's physical memory. As a result of the usage of swap files, the host makes a larger portion of memory available to individual VMs than would be possible if the physical memory resources were strictly divided among all VMs on the host. Typically, the file system creates the swap file as a thick file with a size equivalent to the memory configured for the VM. As a result, the file system fully allocates the storage space needed for the swap file at the time of creation. With large VM memory configurations (e.g., up to 2 TB), the time taken to create a swap file may be nontrivial, and can slow down the overall power on operation significantly.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of minimizing file creation time and file access time for swap files, as well as other large files, using a skip optimization process. In order to store large files within a storage space, a file system typically stores the files using indirect addressing. For example, in order to access a file stored within the storage space, the file system retrieves the file address from a data structure, such as an inode or other file descriptor. The address retrieved from the inode may point to one or more nested layers of pointers stored in pointer blocks that, in turn, point to the location containing the file data (e.g., a "large file block"). While the use of pointer blocks enables address resolution of file blocks for large files, it can also utilize a nontrivial amount of time and resources for the file system to allocate, update, read, and/or delete pointer blocks. Using a pointer block skip optimization as described in this document, a file system can skip one or more nested layers of pointers and directly access a larger amount of storage (a "skip optimized file block" equal in size to multiple large file blocks). Allocating a skip optimized file block, however, would typically require the file system to write zeros to uninitialized portions of the storage, either upon allocation or when the skip optimized file block is written. Zeroing these uninitialized portions of the skip optimized file block may also utilize a nontrivial amount of time and resources. Greater efficiency of resource utilization via the pointer block skip optimization, therefore, is achieved when the file system can allocate skip optimized file blocks without needing to zero uninitialized portions of the skip optimized file blocks.

Embodiments are directed to a file system receiving a request to create a file or otherwise set a file length of a file. In response to receiving the request to set the file length and the request including a flag indicating that the file is a type that the file system can create without zeroing portions of the storage space, embodiments determine whether a storage space includes a predetermined minimum number of available contiguous large file blocks (e.g., equivalent to the addressable area of a pointer block). When the storage space includes the predetermined minimum number of available contiguous large file blocks, the file system skips a pointer block. In such scenarios, the file system uses the starting address of a first block of the predetermined minimum number of available contiguous large file blocks in place of the address to the pointer block.

In some embodiments, the file system receives an I/O request directed at the file, which triggers the address resolution process. For example, the file system receives the I/O request from a program, application, or another computing device. In response to receiving the I/O request, embodiments determine an expected address type for a file address of the file and an actual address type for the file from the metadata data structure. For example, in resolving an address, the file system may retrieve an address mode indicating that the address is for a pointer block. If a large file block address is retrieved instead of the expected pointer block address, the file system recognizes that the file system used skip optimization to create a skip optimized file block. In such embodiments, the file system directly accesses the contiguous large file blocks that make up the skip optimized file block, eliminating the need to read pointer blocks from the disk and store the pointer block data in a pointer block cache.

Figure 1:
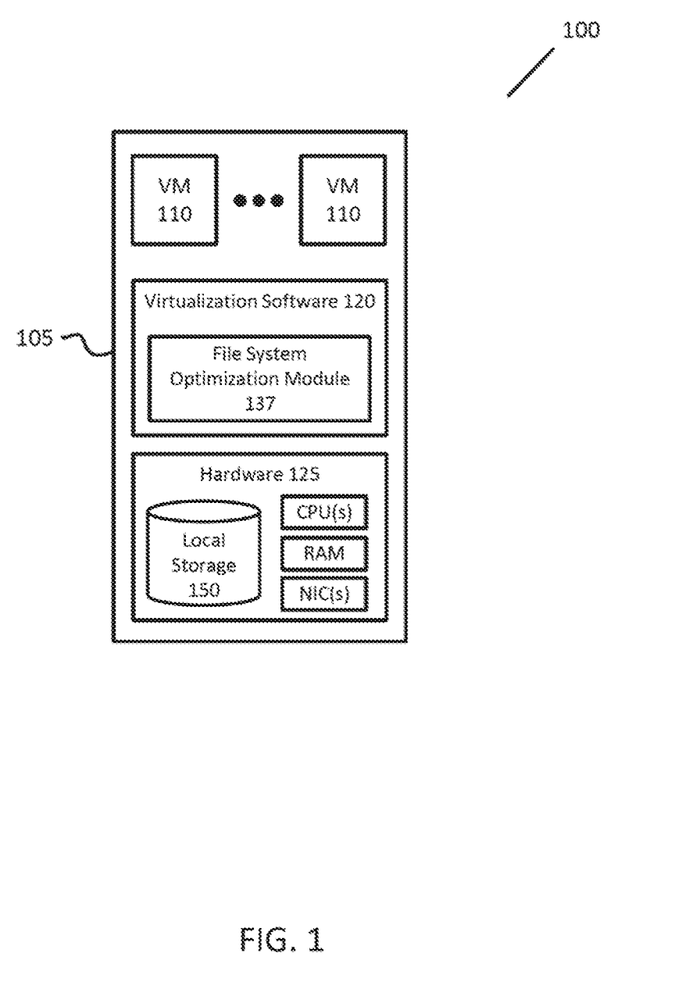
FIG. 1 illustrates, in block diagram form, an exemplary processing device configured to optimize the management and storage of files in storage spaces.

FIG. 1 illustrates, in block diagram form, exemplary processing device 105, configured to optimize the management and storage of files in storage spaces. Processing device 105 may also be referred to within this document as a node, computer, and/or server. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized computer, networking, storage, or security service (e.g., a firewall, webserver, database server, etc.).

Hardware 125 includes one or more processors ("CPU(s)"), data storage and memory (e.g., "RAM"), and network interface controllers ("NIC(s)"). The data storage and memory store data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory.

In some embodiments, one or more buses interconnect the various components of hardware 125. Additionally, the network interface controllers connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in node 105.

Local storage 150 housed in or otherwise directly attached to node 105 may include combinations of solid-state drives (SSDs) and/or magnetic or spinning disks (MDs). As used in this document, the term "housed" or "housed in" may be used to encompass both housed in or otherwise directly attached storage. In some embodiments, SSDs serve as a read cache and/or write buffer in front of magnetic disks to increase I/O performance.

In some embodiments, local storage 150 stores one or more file metadata data structures, e.g., as depicted in and described with reference to FIG. 4. In one embodiment, the file metadata data structure is an on-disk representation of a file that consists of file metadata and addressing information. In some embodiments, the file metadata data structure includes file information, including, but not limited to, address, access times, modification times, an addressing mode, and an address type of the file. In some embodiments, the file metadata data structure is an inode.

Node 105 includes file system optimization module 137. In some embodiments, file system optimization module 137 handles requests to create a file and set a file length for the file, including determining whether file system optimization module 137 can create the requested file using a skip optimization process. File system optimization module 137 determines whether the requested file can be created using the skip optimization process, e.g., as described with reference to FIG. 2.

Figure 2:
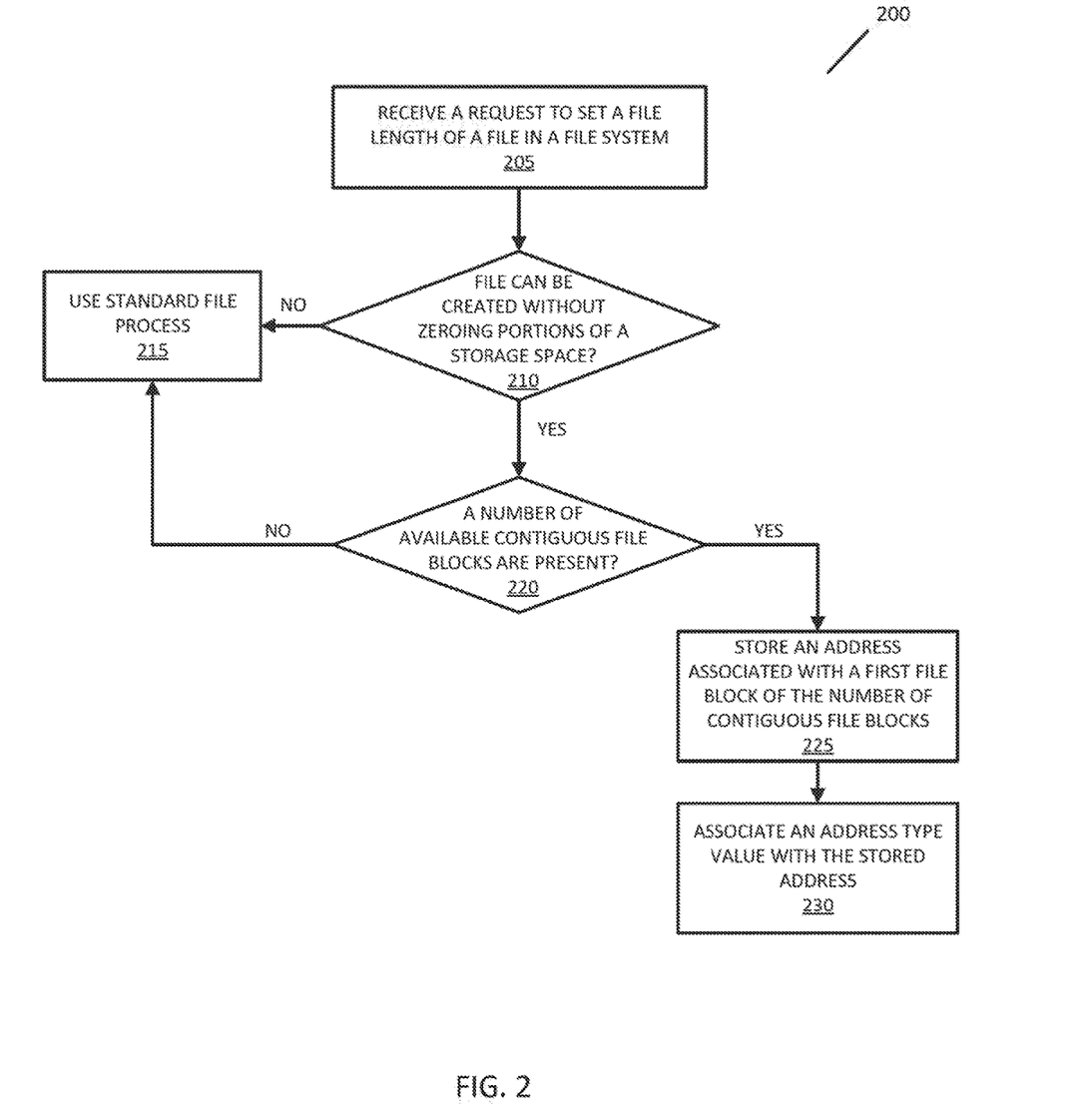
FIG. 2 is a flow chart illustrating an exemplary method of allocating contiguous file blocks in a file system for storage of a file.

FIG. 2 is a flow chart illustrating exemplary method 200 of allocating contiguous large file blocks in a file system for storage of a file. In one embodiment, the file system is a virtual machine file system (e.g., a virtualized environment used to host virtual machine data). In one embodiment, the file system includes a storage space composed of file blocks. In some embodiments, the storage space may include small file blocks in addition to large file blocks. In some embodiments, the small file blocks and the large file blocks may occupy separate areas of the storage space. In some embodiments, large file blocks can be broken down into a plurality of small file blocks when additional small file blocks are required. For example, a large file block may be equivalent to 512 small file blocks.

At block 205, file system optimization module 137 receives a request to set a file length of a file in a file system. In one embodiment, the request the set the file length of the file is part of a request to create the file in the file system. Alternatively, the request to set the file length of the file is a part of a request to extend a file that was previously created by the file system. In one embodiment, the request includes the file length requested for the file.

At block 210, file system optimization module 137 determines whether the file system can create the requested file without zeroing portions of the storage space. In one embodiment, whether the file system can create the requested file without zeroing portions of the storage space is determined based on the presence of a flag, or other indicator, in the request that indicates that the file is of a specific type.

In one embodiment, the flag indicates that the file request is to create a swap file. A file swap subsystem, or file system optimization module 137, keeps track of which blocks of a swap file contain written data and which blocks do not. The file system does not have to manage access to initialized and uninitialized portions of the file. As a result, only initialized portions will be subject to I/O requests and the file system does not have to zero the uninitialized portions or track portions that are to be zeroed.

When the file system optimization module 137 determines that the file system cannot create the requested file without zeroing portions of the storage space, the flow proceeds to block 215. For example, the requested file may have a requirement that the file blocks used for the requested file be zeroed at the time of allocation or include metadata indicating that the file blocks are to be zeroed at the time of I/O request(s) directed to the blocks.

At block 215, in response to determining that the file system cannot create the requested file without zeroing portions of the storage space, file system optimization module 137 proceeds to block 215 to perform standard file processing. In some embodiments, in standard file processing, a number of small file blocks required to store the file are determined, and the addresses of each of the small file blocks are stored in either the file metadata data structure or in pointer blocks. For example, if the addressing mode of the address stored in the file metadata data structure is single indirect, the address points to a location in a pointer block storing an address to a small file block. If the addressing mode of the address stored in the file metadata data structure is double indirect, the address points to a location in a pointer block storing an address to a second pointer block, where the address in the second pointer block stores an address to a small file block.

At block 220, in response to determining that the file system can create the requested file without zeroing portions of the storage space, file system optimization module 137 determines whether there are at least a number of available contiguous large file blocks present. In some embodiments, file system optimization module 137 accesses a storage space composed of file blocks to determine the availability of large file blocks in the storage space. In another embodiment, file system optimization module 137 accesses a map of the storage space, or another data structure storing status information of files blocks in the storage space, to determine the availability of large file blocks in the storage space. In one embodiment, file system optimization module 137 makes the determination prior to receiving the request to set the file length and the result of the determination is stored. For example, file system optimization module 137 can make the determination when processing device 105 initializes the file system and storage space. In such embodiments, the file system optimization module 137 accesses the information in response to receiving the request. In other embodiments, the file system optimization module 137 makes the determination in response to receiving the request to set the file length.

In some embodiments, the number of available contiguous large file blocks is a minimum number needed to store the requested file. In such embodiments, file system optimization module 137 determines whether the storage space contains the minimum number of available large file blocks. In one embodiment, file system optimization module 137 determines the minimum number of available contiguous large file blocks for the file using the size of the addressable area of a pointer block and the addressable area of a file block. For example, file system optimization module 137 may determine if there are at least sixteen contiguous large file blocks available. This allows the file system to use the minimum number of available contiguous large file blocks as a single file system resource, and allows the file system to bypass the use of a pointer block. In such embodiments, the minimum number of available contiguous file block is determined based on the following formula:

$$\frac{\text{Pointer Block Addressable Area}}{\text{Large File Block Addressable Area}} =$$

Minimum # of Available Contiguous Large File Blocks

The addressable area of a pointer block can be determined based on the following formula:

Number of Addresses in a Pointer Block×Size of Small File Block=Pointer Block Addressable Area The addressable area of a file block can be determined based on the following formula:

Number of Small File Blocks in a Large File Block× Size of Small File Block=Large File Block Addressable Area When file system optimization module 137 determines that the minimum number of available contiguous large file blocks are not present, the flow proceeds to step 215 for standard file processing, as described above. When file system optimization module 137 determines that the minimum number of available contiguous large file blocks are present (e.g., enough space equivalent to the addressable area of the pointer block), the flow proceeds to block 225.

At block 225, in response to determining that the storage space includes the minimum number of available contiguous large file blocks, file system optimization module 137 stores an address associated with a first file block of the number of available contiguous large file blocks. In some embodiments, the address associated with the first file block of the number of available contiguous large file blocks is stored in the file metadata data structure.

At block 230, file system optimization module 137 associates an address type value with the stored address associated with a first file block of the number of contiguous large file blocks. In one embodiment, the address type value is one or more bits that can be set to one of a plurality of different address types, including, but not limited to, sub-block, file block, and pointer block. For example, the address type may be represented by one or more bits that, in addition to an address, make up a pointer.

In one embodiment, the plurality of different address types includes a skip optimized file block address type. In such embodiments, the address type value indicates that the address saved to the file metadata data structure for the requested file is a skip optimized file block address. In some embodiments, denoting the address as a skip optimized file block address indicates that the address location pointed to the by the skip optimized file block address is the start of a contiguous region of the storage space equivalent to the addressable area of a pointer block.

Figure 3:
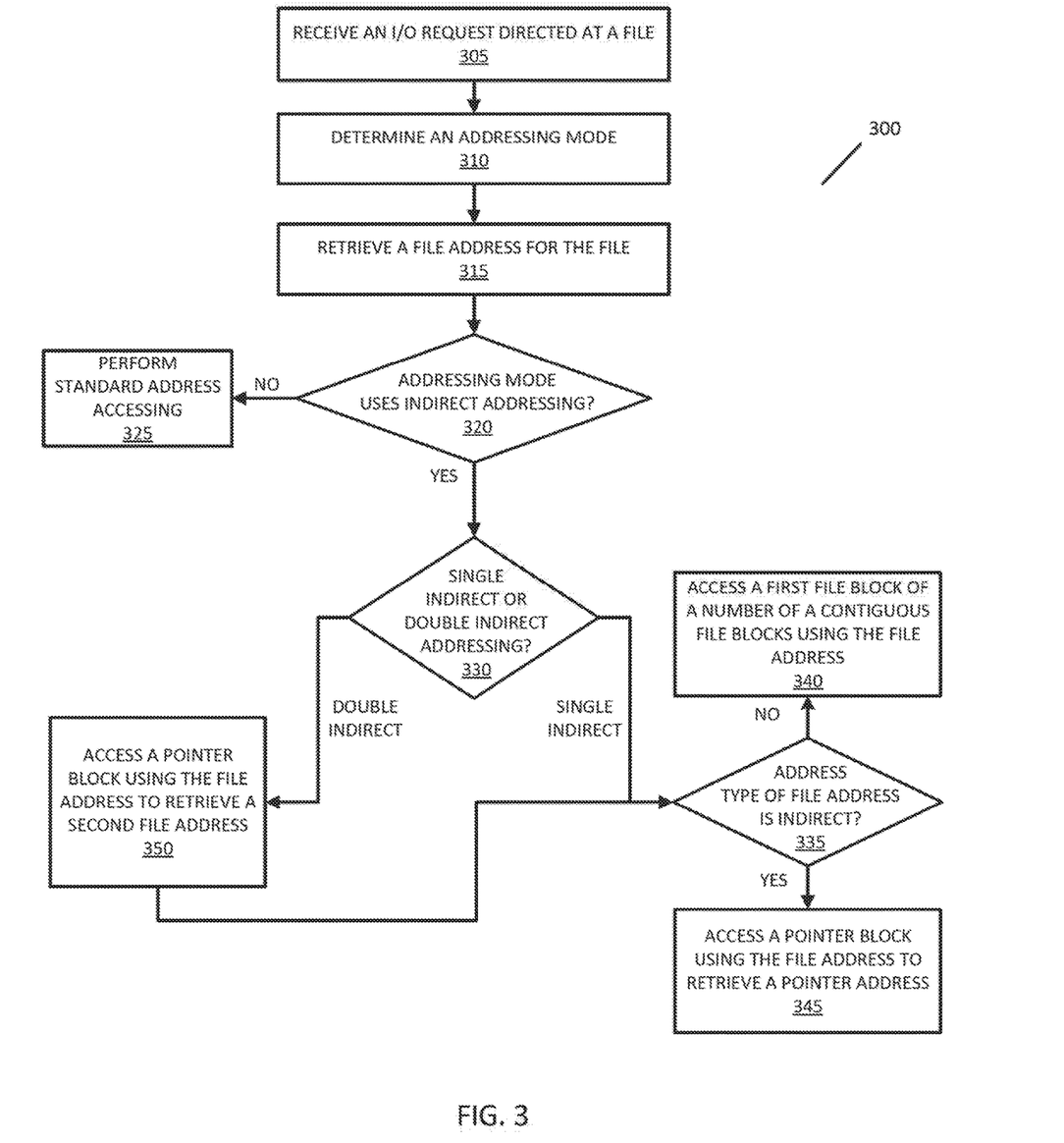
FIG. 3 is a flow chart illustrating an exemplary method of performing address resolution of a file stored in a file system.

FIG. 3 is a flow chart illustrating an exemplary method of performing address resolution of a file stored in a file system of processing device 105. Address resolution is the process for determining the location within a disk or storage space where a file is located. In one embodiment, one or more of blocks 305-350 of method 300 is performed by file system optimization module 137.

At block 305, processing device 105 receives an I/O request directed at a file. In some embodiments, the I/O request is to write to or read from the file stored within the file system. In some embodiments, processing device 105 receives the I/O request internally or externally by processing device 105 from another computing device.

At block 310, an addressing mode associated with the file is determined. In one embodiment, processing device 105 accesses the file metadata data structure to determine the addressing mode associated with the file. In one embodiment, the possible addressing modes are small data, direct, single indirect, and double indirect. When the addressing mode indicates that the file is stored as small data, the file data itself is small enough to be stored in file metadata data structure. When the addressing mode indicates that the file is stored using direct addressing, the address stored in file metadata data structure is the address of a small file block. When the addressing mode indicates that the file is stored using single indirect addressing, the address stored in file metadata data structure is the address of a pointer block, where the addressed location in the pointer block is the address to a large file block. When the addressing mode indicates that the file is stored using double indirect addressing, the address stored in the file metadata data structure is the address of a pointer block, where the addressed location in the pointer block is the address to another pointer block storing the address to the large file block. In some embodiments, as an addressing space for a file increases, the file system upgrades the file from a smaller addressing mode to a larger addressing mode (e.g., from small data to direct addressing).

At block 315, processing device 105 retrieves a file address for the file from file metadata data structure. In some embodiments, processing device 105 also retrieves an address type indicator and uses the retrieved address type indicator to determine the address type associated with the file.

At block 320, processing device 105 determines whether the addressing mode associated with the file is a direct addressing mode or an indirect addressing mode. When the addressing mode is direct, the flow proceeds to block 325. When the addressing mode is indirect, the flow proceeds to block 330.

At block 325, standard address resolution is performed when processing device 105 determines the addressing mode indicates that the file does not use indirect addressing. For example, if the file address is a direct address, the address in file metadata data structure resolves to a small file block. If the address mode indicator indicates that the file address is a small data address, file metadata data structure contains the file data.

At block 330, processing device 105 determines whether the addressing mode associated with the file is single indirect addressing or double indirect addressing. When the addressing mode is single indirect addressing, the flow proceeds to block 335. When the addressing mode is double indirect addressing, the flow proceeds to block 350.

At block 335, processing device 105 determines whether the address type of the address retrieved from file metadata data structure for the file is an indirect address (e.g., a pointer address). When the addressing mode of the file is single indirect, processing device 105 would typically expect the address type to be an indirect address (e.g., a pointer address in a pointer block). When the address type of the address retrieved for the file is not an indirect address, but is instead a direct address, this is an indication that file optimization module 137 used skip optimization to create the file, and the flow proceeds to block 340. When the address type of the address retrieved for the file is an indirect address, this is an indication that file optimization module 137 did not use skip optimization to create the file, and the flow proceeds to block 345.

At block 340, processing device 105 accesses a first file block of a number of contiguous large file blocks using the address retrieved from file metadata data structure. In some embodiments, as file optimization module 137 used skip optimization to create the file, processing device 105 does not have to read in a pointer block, but instead can directly access the first file block of the number of contiguous large file blocks using the skip optimized file address. For example, the file system carries out an I/O request on the corresponding contiguous group of large file blocks. In some embodiments, the number of contiguous file blocks has an addressable area equivalent to the addressable area of a pointer block.

At block 345, processing device 105 accesses a pointer block using the address retrieved from file metadata data structure to retrieve an address pointing to a file block. In one embodiment, processing device 105 reads the pointer block from the disk and caches the pointer block in a pointer block cache prior to processing device 105 retrieving the address from the pointer block pointing to the file block.

At block 350, in the case of double indirect addressing, processing device 105 accesses a pointer block using the file address to retrieve a second file address. The flow then proceeds to block 335, as described above, using the retrieved second file address in a manner similar to single indirect addressing. In one embodiment, processing device 105 reads a pointer block pointed to by the address retrieved from file metadata data structure into the cache. In such an embodiment, processing device 105 then accesses the address location within the pointer block indicated by the address retrieved from file metadata data structure.

Figure 4:
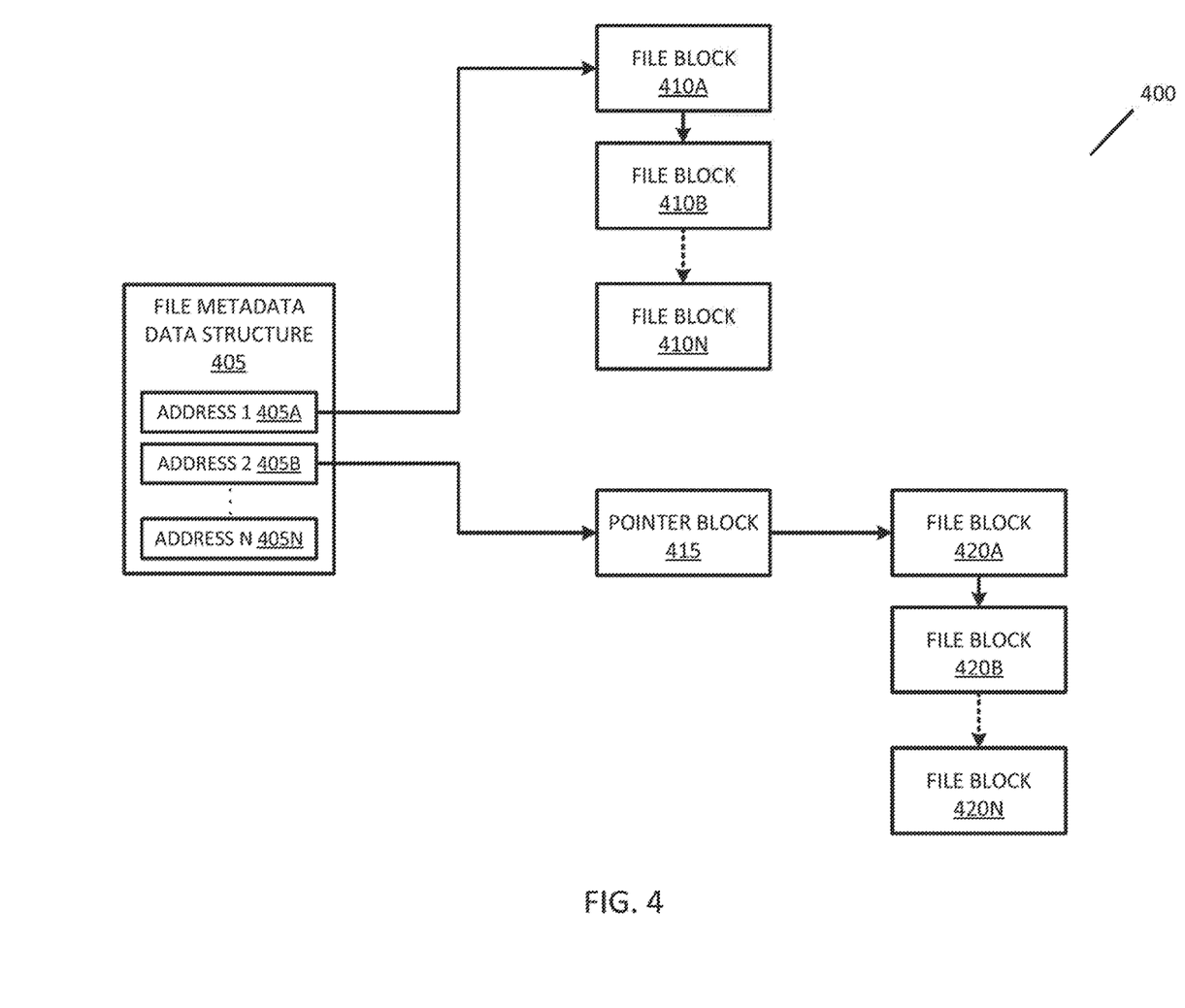
FIG. 4 illustrates an exemplary file system 400 including a file metadata data structure and storage spaces using skip optimization according to embodiments described herein.

FIG. 4 illustrates an exemplary file system 400 including file metadata data structure 405 and storage spaces using skip optimization according to embodiments described herein. In FIG. 4, file metadata data structure 405 includes plurality of address entries 405A-405N. Each of address entries 405A-405N includes file information, including, but not limited to, address, access times, modification times, an addressing mode, and an address type of the file.

Address 1 405A points to a first file block 410A of a number of contiguous file blocks 410A-410N comprising a file, where file optimization module 137 created the file using the skip optimization process. In file system 400, file optimization module 137 created the file associated with address 1 405A using a single indirect addressing mode. Rather than address 1 405A leading to a pointer in a pointer block as indicated by the single indirect addressing mode, however, address 1 405A points to the first of a plurality of contiguous large file blocks.

Address 2 405B points to a location in pointer block 415. Pointer block 415 includes an address pointing to first file block 420A of a number of contiguous file blocks 420A-420N comprising a file. File optimization module 137 created the file using the skip optimization process. In file system 400, file optimization module 137 created the file associated with address 2 405B using a double indirect addressing mode. Rather than address 2 405B leading to multiple nested layers of pointers as indicated by the double indirect addressing mode, however, address 2 405B points to only a single pointer block 415 and pointer block 415 points to the first of a plurality of contiguous large file blocks.

It will be apparent from this description that aspects of the inventions may be embodied, at least in part, in software. That is, computer-implemented methods 200 and 300 may be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   receiving a request to set a file length of a file within a file system, the request including a flag indicating that the file is a type that can be created without zeroing portions of a storage space comprising the file system required to store the file;
   in response to receiving the request to set the file length and the request including the flag, determining that the storage space includes a minimum number of available contiguous file blocks, wherein the minimum number of contiguous file blocks is based on a number needed to treat the contiguous file blocks as a single file system resource without using a pointer block; and
   storing an address associated with a first file block of the minimum number of available contiguous file blocks in a location within a file metadata data structure indicated to include an indirect address for the pointer block in response to determining that the storage space includes the minimum number of available contiguous file blocks.

2. The computer-implemented method of claim 1, wherein the flag indicates that the requested file is for a swap file for memory for the file system, wherein zeroing portions of the storage space is unnecessary because the file system does not manage access to initialized and uninitialized portions of the swap file.

3. The computer-implemented method of claim 1, further comprising:
   associating an address type value with the stored address associated with the first file block in the file metadata data structure, the address type value indicating that the stored address is a skip optimized address.

4. The computer-implemented method of claim 1, wherein determining that the storage space includes the minimum number of available contiguous file blocks comprises:
   calculating an addressable area of an indirect file block pointed to by the indirect address, the addressable area of the indirect file block being the product of a number of addresses associated with the indirect file block and a file block size; and
   determining that the file length is at least equal to the calculated addressable area of the indirect file block.

5. The computer-implemented method of claim 1, further comprising:
   receiving an I/O request directed at the file;
   determining an expected address type for a file address of the file based on an address mode for the file; and
   retrieving an address type for the file from the metadata data structure, the address type being different from the expected address type.

6. The computer-implemented method of claim 5, wherein the expected address type is an indirect address type, and wherein the retrieved address type is a direct address type.

7. The computer-implemented method of claim 1, wherein the indirect address is an address to a pointer location within a pointer block that points to a file block.

8. A non-transitory computer-readable medium storing instructions, which when executed by a processing device, cause the processing device to perform a method comprising:
computer-implemented method, comprising:
   receiving a request to set a file length of a file within a file system, the request including a flag indicating that the file is a type that can be created without zeroing portions of a storage space comprising the file system required to store the file;
   in response to receiving the request to set the file length and the request including the flag, determining that the storage space includes a minimum number of available contiguous file blocks, wherein the minimum number of contiguous file blocks is based on a number needed to treat the contiguous file blocks as a single file system resource without using a pointer block; and storing an address associated with a first file block of the minimum number of available contiguous file blocks in a location within a file metadata data structure indicated to include an indirect address for the pointer block in response to determining that the storage space includes the minimum number of available contiguous file blocks.

9. The non-transitory computer-readable medium of claim 8, wherein the flag indicates that the requested file is for a swap file for memory for the file system, wherein zeroing portions of the storage space is unnecessary because the file system does not manage access to initialized and uninitialized portions of the swap file.

10. The non-transitory computer-readable medium of claim 8, further comprising:

associating an address type value with the stored address associated with the first file block in the file metadata data structure, the address type value indicating that the stored address is a skip optimized address.

11. The non-transitory computer-readable medium of claim 8, wherein determining that the storage space includes the minimum number of available contiguous file blocks comprises:

calculating an addressable area of an indirect file block pointed to by the indirect address, the addressable area of the indirect file block being the product of a number of addresses associated with the indirect file block and a file block size; and determining that the file length is at least equal to the calculated addressable area of the indirect file block.

12. The non-transitory computer-readable medium of claim 8, further comprising:

receiving an I/O request directed at the file;

determining an expected address type for a file address of the file based on an address mode for the file; and retrieving an address type for the file from the metadata data structure, the address type being different from the expected address type.

13. The non-transitory computer-readable medium of claim 12, wherein the expected address type is an indirect address type, and wherein the retrieved address type is a direct address type.

14. The non-transitory computer-readable medium of claim 8, wherein the indirect address is an address to a pointer location within a pointer block that points to a file block.

15. An apparatus comprising:
a processing device; and
a memory coupled to the processing device, the memory storing instructions which, when executed by the processing device, cause the apparatus to:

receive a request to set a file length of a file within a file system, the request including a flag indicating that the file is a type that can be created without zeroing portions of a storage space comprising the file system required to store the file;

in response to receiving the request to set the file length and the request including the flag, determine that the storage space includes a minimum number of available contiguous file blocks, wherein the minimum number of contiguous file blocks is based on a number needed to treat the contiguous file blocks as a single file system resource without using a pointer block; and store an address associated with a first file block of the minimum number of available contiguous file blocks in a location within a file metadata data structure indicated to include an indirect address for the pointer block in response to determining that the storage space includes the minimum number of available contiguous file blocks.

16. The apparatus of claim 15, wherein the indirect address is an address to a pointer location within a pointer block that points to a file block.

17. The apparatus of claim 15, wherein the instructions further cause the apparatus to:

associate an address type value with the stored address associated with the first file block in the file metadata data structure, the address type value indicating that the stored address is a skip optimized address.

18. The apparatus of claim 15, wherein determining that the storage space includes the number of available contiguous file blocks comprises:

calculating an addressable area of an indirect file block pointed to by the indirect address, the addressable area of the indirect file block being the product of a number of addresses associated with the indirect file block and a file block size; and determining that the file length is at least equal to the calculated addressable area of the indirect file block.

19. The apparatus of claim 18, wherein the instructions further cause the apparatus to:

receive an I/O request directed at the file;

determine an expected address type for a file address of the file based on an address mode for the file; and retrieve an address type for the file from the metadata data structure, the address type being different from the expected address type.

20. The apparatus of claim 19, wherein the expected address type is an indirect address type, and wherein the retrieved address type is a direct address type.

* * * * *